April 6, 1965 L. G. BROWN 3,177,367
SOLAR OPERATED LOUVER APPARATUS
Filed Sept. 4, 1962 2 Sheets-Sheet 1

LEMUAL G. BROWN
INVENTOR.

BY
Robert K. Rhea
AGENT

April 6, 1965      L. G. BROWN      3,177,367

SOLAR OPERATED LOUVER APPARATUS

Filed Sept. 4, 1962      2 Sheets-Sheet 2

INVENTOR.
LEMUAL G. BROWN
BY
Robert K. Rhea
AGENT

United States Patent Office 3,177,367
Patented Apr. 6, 1965

3,177,367
SOLAR OPERATED LOUVER APPARATUS
Lemual G. Brown, P.O. Box 8777, Britton, Okla.
Filed Sept. 4, 1962, Ser. No. 221,289
8 Claims. (Cl. 250—237)

The present invention relates generally to louvered apparatus and more particularly to a louver control.

The present invention is related to an application filed by me in the United States Patent Office on December 21, 1959, for Solar Operated Louver Apparatus, Serial Number 860,887, now United States Patent 3,064,131, which patent is a continuation-in-part of Brown United States Patent 2,917,795.

The present invention is an improvement over the above referred to application by an improved electronic circuit and eliminating the transparent dome containing the sensing element and mounting the latter on one of the louvers to more accurately control the light level within a building.

Many office and industrial buildings are now, or, are being equipped with louvers for covering the windows or openings therein, thereby providing a means for controlling the amount of light entering the building as well as providing some protection for glazed openings during stormy weather. These louvers comprise a plurality of blades or slats of metallic, or other suitable material, arranged vertically. The louvers are each pivotally mounted adjacent their respective ends and, when closed, one vertical edge portion of each preceding blade overlaps the adjacent edge portion of each succeeding blade. Such a louvered apparatus may have the louvers or blades thereof positioned for admitting passage of substantially all of the light rays falling thereon, and, conversely, the louvers may be closed for shutting out substantially all of the light rays. Such adjustments are highly desirable particularly where the apparatus is used for controlling the amount of sunlight striking a large glazed area such as an office building, or the like, wherein a maximum amount of light is desired, and in which the direct rays of sunlight are objectionable. Time controlled devices have been connected with such louvered apparatus whereby the louvers are moved toward an open or closed position in accordance with a predetermined selected time. This type of installation is fairly satisfactory but requires that the timing, or selected times the apparatus is actuated, be changed in accordance with the seasons. Furthermore, a time control for louvered apparatus does not provide for cloudy or overcast skies wherein it may be desired to leave the louvers in open position to admit a maximum of the available light.

It is, therefore, the principal object of the present invention to provide a solar control for a louver apparatus wherein the louvers are vertically positioned.

A similarly important object is to provide a solar control which will progressively open or close the blades of vertically mounted louvers and permit a maximum amount of sunlight to pass therebetween and yet shield the louver-covered opening from the direct rays of sunlight.

Another object of the invention is the provision of a control of this class which, being responsive to the intensity of sunlight, will maintain the vertically mounted louvers of a louver-covered opening in maximum light admitting position on dark or overcast days.

Another object of the present invention is the provision of time delay means within the solar control for preventing actuation of the control by the momentary passage of shadows.

A further object is to provide a solar control for a louver apparatus which may be selectively operated manually or which may be connected for mechanical or clock control at selected intervals.

Another object is to provide a solar control for a louver apparatus which is not a function of time nor of season and which requires no adjustment or manual regulating after placing the system in operation but which includes switching means whereby the louvers may be rotated to a desired position and maintained in such position.

Another object is to provide a solar control unit wherein delay relays are included to prevent a fanning action of the louvers as a result of a rapid fluctuating light level and to automatically synchronize any louver operating power unit with the solar control unit.

Another important object of the present invention is the provision of a solar controlled apparatus wherein vertically positioned louvers will be reversed from a light closing position to a light admitting position under predetermined conditions.

The present invention accomplishes these and other objects by connecting a plurality of photocells to one louver of a motor controlled set of louvers and interposing electronic and power controlling units between said photocells and the motor for selectivity positioning the louvers in response to sunlight on said photocells.

Other objects will be apparent from the following description when taken in conjunction with the accompanying two sheets of drawings, wherein.

Like characters of reference designate like parts in those figures of the drawings in which they occur.

In the drawings.

Figure 1:
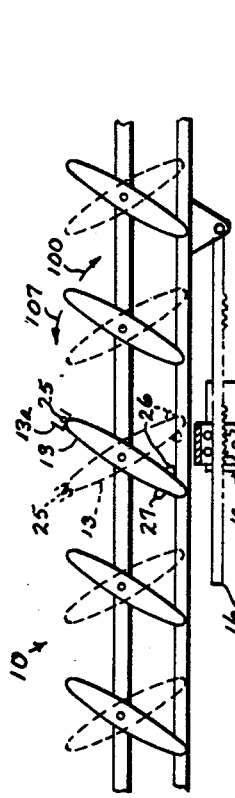
FIGURE 1 is a top plan view of a fragment of a set of louvers and the relative relation of the louver control device when connected therewith.
Figure 2:
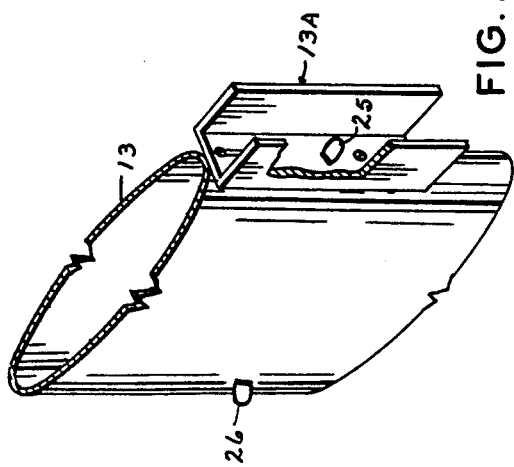
FIGURE 2 is a fragmentary perspective view of one of the louvers having radiation intensity sensing elements mounted thereon.

Referring more particularly to FIG. 1, the reference numeral 10 indicates, as a whole, a set of vertically disposed louvers arranged in pivoting overlapping relation when fully closed for controlling the light level behind a glass closed wall of a building, not shown. For descriptive purposes, the set of louvers 10 is to be considered shielding a south elevation of a building. An imaginary plane, normal to the building and through the respective vertical axis of the louvers, divides the louver movement into a first quadrant and a second quadrant. The louvers are shown by solid lines in the first quadrant and by dotted lines in the second quadrant.

A master power unit 12 drives a gear train 14 and a toothed gear 15 which engages a toothed rack 16 connected with each of the louvers for pivoting the latter about their respective vertical axis.

An electronic control unit 18, connected with one or more photocells mounted on one of the louvers 13, operates the master unit 12 in response to radiation intensity of the sun in a manner more fully disclosed hereinbelow.

Figure 3:
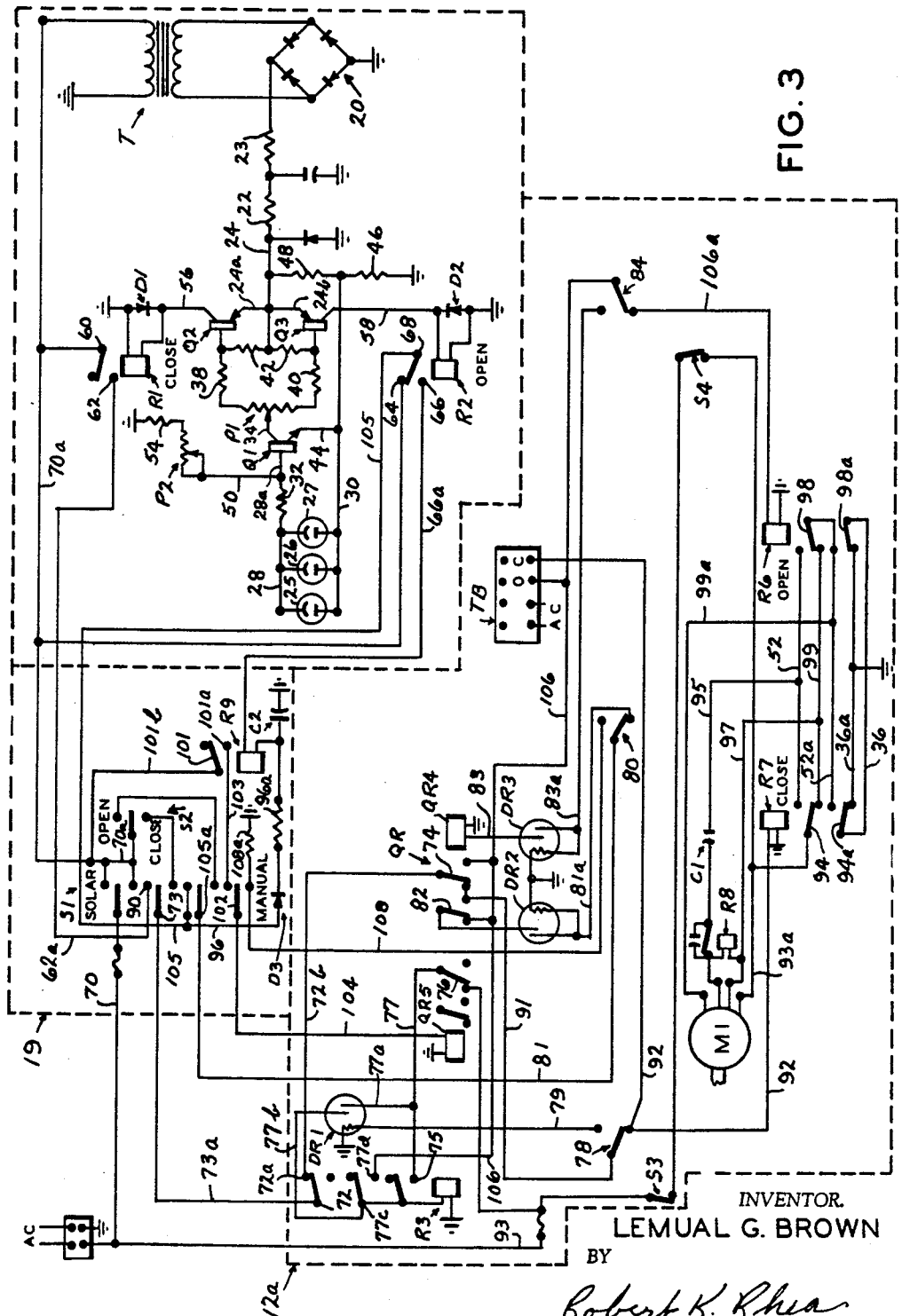
FIGURE 3 is a wiring diagram of the device.

Referring now to FIG. 3, a transformer T, connected with a source of alternating current by a wire 70a, is connected by its secondary winding or output side with a full wave rectifier 20. One lead of the rectifier 20 is connected to ground and the other lead is connected by a wire 24 through resistors 22 and 23 and to the respective emitter of a pair of transistors Q2 and Q3 by wires 24a and 24b, respectively. Three photocells 25, 26 and 27, connected in parallel by a shielded cable containing a pair of wires 28 and 30, are mounted, in a manner more fully disclosed hereinbelow, on opposing sides and the forward edge of one louver 13. The wire 28 is connected through a resistor 32 and wire 28a to a third transistor Q1. The collector branch of the transistor Q1 is connected to the indicator 34 of a potentiometer P1 which is in turn connected, at its respective ends, through resistors 38 and 40 to the transistors Q2 and Q3, respectively. The potentiometer P1 controls the "spread" or permitted variations of the current from the photocells before starting movement of the louvers 10. The resistance of resistor 38 is substantially greater, for example, ten times in value, than the resistance of the resistor 40 for the purposes which will presently be apparent. A pair of equal value resistors 42, connected with the wire 24, are connected to the respective leads of the transistors Q2 and Q3. The wire 30 is connected with the emitter of the transistor Q1 by a wire 44 and to ground and the wire 24 through resistors 46 and 48, respectively. The wire 28a is tapped between the resistor 32 and its connection with the transistor Q1 and connected to ground by a wire 50 through a potentiometer P2 and a resistor 54. The potentiometer P2, in combination with the potentiometer P1, controls the "sensitivity" of the electronic circuit. The collector lead of the transistor Q2 is connected to ground through the coil of a relay R1 by a wire 56. A diode D1 is interposed in the wire 56, between its connections with the coil of relay R1, to direct the current through the coil. The collector lead of the transistor Q3 is similarly connected to ground by a wire 58 through the coil of a relay R2 with a diode D2 interposed in the wire 58 between its connections with the coil. The armature and one contact 60 of the relay R1 is connected to the current source and the other contact 62 is connected to a switch S1 in a control panel 19 by a wire 62a. Similarly one contact 64 of the relay R2 is connected to the current source while the other contacts 66 and 68 are connected to the control panel 19 by wires 66a and 105, respectively.

The control panel 19 switch S1 is a quadruple pole three position manually operated switch having one pole connected to the current source by a wire 70. The switch S1 is shown in mid or "off" position and, as viewed in FIG. 3, is manually movable between an upper directed position of its armatures for solar operation of the device or a downwardly directed position of its armatures for manual operation as will be more fully explained hereinbelow.

The master power unit 12 controls the operation of the louvers and its wiring is indicated by the numeral 12a in FIG. 3. The power unit includes a reversing relay R3 which has one of its contacts 72 connected with a contact 73 of the switch S1. The power unit also includes a locking quadrant relay generally designated QR having two coils QR4 and QR5 hereinafter referred to as quadrant relays QR4 and QR5. The relay R3 is shown in de-energized position. The contact 72 is connected through its armature with point 72a to one armature 74 of the quadrant relay QR by a wire 72b. Another contact 75 of relay R3 is connected with an armature 76 of the quadrant relay QR by a wire 77. The quadrant relay QR is shown in quadrant one position. A time delay relay DR1 has one of its leads connected with a contact 77c of relay R3 by a wire 77b and has its other lead connected by a wire 77a to the wire 77 connected with the armature 76 of quadrant relay QR. One terminal of the heater of the time delay relay DR1 is connected by wire 79 to a normally open contact of a "close" limit switch 78 which controls the movement of the louvers in a manner more fully disclosed hereinbelow. The other terminal of the heater of time delay relay DR1 is grounded.

A normally-closed center limit switch 80 is connected with one contact 105a of the switch S1 by a wire 81 and is connected with one lead and one contact of the heater of a time delay relay DR2 by a wire 81a. The other lead of time delay relay DR2 is connected to an armature 82 of the quadrant relay QR. One end of the coil of relay QR4 is grounded and its other end is connected to one lead of a time delay relay DR3 by a wire 83. The other lead and one end of the heater of the time delay relay DR3 is connected by a wire 83a to a normally open contact of an "open" limit switch 84 which similarly controls the movement of the louvers as more fully described hereinbelow. The other ends of the heaters of time delay relays DR2 and DR3 are connected together and to ground.

Referring also to FIG. 1, the power unit 12 contains a motor M1 with its windings connected to the current source through motor starting relays R6 and R7. The motor drives a lead screw or shaft 86 which moves a traveling bar 87 which contacts the limit switches 78, 80 and 84, for controlling the movement of the louvers in cooperation with signals received from the electronics panel 18. Positive "cut-off" switches S3 and S4, located at the respective ends of the shaft 86, stop the motor M1 in the event of failure or faulty operation of some component.

Operation of the device will be more easily understood from a description of its action. As stated above, the photocells 25, 26 and 27 are mounted on one of the louvers 13. The photocell 25, on the forward or front edge of the louver 13, is mounted within a channel member 13A with the parallel legs of the channel directed outwardly of the forward edge of the louver. The photocells 26 and 27, mounted on respective rearward side edges of the louver 13, are not shielded from solar radiation except by the shadow of adjacent louvers.

With the switch S1 in solar operating position a high level of radiation intensity striking any one of the solar cells 25, 26 or 27, increases the current over the wires 28 and 30. Current from the energized cell passes through the resistor 32 to the transistor Q1. Current from the transistor Q1 is passed from its collector by wire 34 and to the potentiometer P1 and to the transistors Q2 and Q3 through the resistors 38 and 40, respectively. Since the resistor 40 is of relatively low value the greater amount of current passes to the transistor Q3. Current from the collector of transistor Q3 energizes the relay R2 by wire 58. Energizing relay R2 moves its armature from contact 64 to make with its other contact 66 and interrupt conduction of a louver "open" signal.

The contact 66 of relay R2 is connected with one end of the coil winding of a relay R9 in the control panel 19 by a wire 66a. A wire 96 is connected at one end to the "open" signal wire 105 in the control panel and connected at its other end portion through a diode D3 and resistor 96a to the other end of the winding of relay R9 and then to ground through a capacitor C2. The diode D3 and resistor 96a permits a charge to slowly build up on the capacitor C2 from the contacts 64 and 68 of relay R2 over wire 105 so that energizing relay R2 to make contact with point 66 completes a circuit through the winding of the coil of relay R9 and discharges the capacitor C2 to energize relay R9. Energizing relay R9 moves its armature 101 downwardly, as seen in FIG. 3, to make with its contact 101a. Armature 101 is connected with the current source wire 70a by wire 101b to pass a current over wire 103, connected with the contact 101a of relay R9, to the armature 102 in the switch S1 and to the coil winding of quadrant relay QR5 over a wire 104. This insures that the quadrant relay QR is in quadrant one position.

As current from the cells increases by solar radiation intensity it passes through the resistor 38, to the transistor Q2. The collector of transistor Q2 energizes relay R1 by wire 56 which moves the armature of relay R1 to make with contact 62 and originate a louver "close" signal. Contact 60, connected with the current source, is connected with contact 90 of the switch S1, in the control panel 19, passing current through contact 73 of switch S1 and over wire 73a to contact 72 in relay R3 and over the wire 72b to armature 74 in the quadrant relay QR which is in turn connected with the close limit switch 78 by a wire 91. The current passes through the close limit switch 78 to relay R7 over wire 92 energizing relay R7 and moving its armatures 94 and 94a upwardly, as viewed in FIG. 3. Alternating current from a wire 93, which is connected in series through positive "cut-off" switches S3 and S4, and to the running winding of the motor M1 by a wire 93a, then flows through the armature 94 of relay R7 to a motor starting relay R8 over wires 52 and 95 and through a capacitor C1. The motor starting winding is connected by a wire 97 to the other end of the coil winding of relay R8 and to an armature 98 of the relay R6 by a wire 99. The armature 98 is connected by the wire 52a with a second armature 94a of relay R7 which is in turn connected to the current source neutral or ground through a second armature 98a of the relay R6 to complete the motor starting circuit. The other end of the running winding of the motor M1 is connected by a wire 99a to the wire 52a thus completing the motor running circuit. The motor continues moving the louvers in a clockwise closing direction indicated by the arrow 100, until the energized solar actuated cell is shaded, thus reducing the current and de-energizing relay R1. When relay R1 is de-energized it releases its armature to interrupt the current to relay R7. Restoring relay R7 interrupts the current to the motor M1. The above louver closing action is repeated when solar radiation again increases the current from either of the cells.

A low level of radiation intensity on the photocells reduces the value of a current from the potentiometer P1 to the transistor Q3 and releases the relay R2. This moves the armature of relay R2 from its contact 66 to make with contact 64. A current from the source then flows through the contacts 64 and 68 of relay R2, over wire 105 to the switch S1, and the contact 105a and through the center limit switch 80 to the heater of delay relay DR2 over wires 81 and 81a. This energizes the heater of time delay relay DR2. After a selected delay the contacts of time delay relay DR2 closes to pass a current through the armature 82 of the quadrant relay QR and to the open limit switch 84 over wire 106. The purpose of the time delay relay DR2 is to prevent an opening action of the louvers by any momentary shadow shading the photocells. A wire 106a, connected to the wire 106 through the limit switch 84, is connected to the coil of relay R6 which moves its armatures 98 and 98a upwardly, as viewed in FIG. 3. Current then passes from the current source wire 93 through the armature 94 of relay R7 and wire 99 to the motor starting winding wire 97 to start the motor M1 rotating in an opposite or louver opening direction as disclosed hereinbelow.

A circuit to neutral or ground for the other side of the motor starting winding is then completed over wire 95, wire 52, interconnected armatures 98 and 98a of relay R6, wire 36, relay R7 armature 94a and wire 36a. Similarly this completes the running winding circuit of the motor M1 by one of its windings connected with the wire 93a connected to the current source wire 93, while its other running winding is connected to neutral or ground by the wire 99a, the wire 52a, relay R6 armature 98a, wire 36, relay R7 armature 94a and wire 36a.

The motor M1 continues the opening movement of the louvers until radiation intensity on one of the cells increases which increases the current to relay R2 and energizes the latter moving its armature from point 64 to make with point 66 thus interrupting the louver open signal.

When the sun reaches such a position with respect to the louvers 10 that a further closing action of the louvers would close the latter to such an extent that a desired light level would not be maintained within the building, the control unit rotates the louvers 10 to a fully closed position in the first quadrant, so that the bar 87 contacts the close limit switch 78 which moves its armature into contact with wire 79 connected with the heater of time delay relay DR1. Opening the close limit switch 78 releases motor starting relay R7 and stops the motor M1. After a selected delay the contacts of time delay relay DR1 closes and energizes the coil of relay R3 from the current source through the current source contact 76 of quadrant relay QR and wires 77, 77a and 77b, thus reversing the armatures of relay R3 from the position shown to make with their other contacts. Current then flows from the source over wires 77, 77a, 77b, through relay R3, contacts 77c and its armature, now contacting point 77d, connected with wire 106, which in turn energizes the motor starting relay R6 through the wire 106a connected with the wire 106 through the open limit switch 84 thus starting the motor M1 as disclosed hereinabove for the louver opening signal in a direction to move the louvers in a counter clockwise direction shown by the arrow 107 (FIG. 1). When the motor M1 moves the bar 87 out of opening contact with the close limit switch 78, the latter closes and breaks the circuit to delay relay DR1, but the coil of relay R3 is maintained energized from the source through quadrant relay armature 76 and wire 77 connected to point 75 of relay R3.

Energizing reversing relay R3 changes the louvers from quadrant one to quadrant two position and removes the power unit from control by the cells 25, 26, 27 and the other components of the electronics unit until the quadrant position change has been completed. This counter clockwise rotating action of the louvers continues while the motor moves its bar 87 into contact with and opens the center limit switch 80 which, when opened, is connected with ground by a wire 108 through a contact in the switch S1 and a low value resistor 108a but does not stop the motor because the motor energizing signal is originating through the quadrant relay QR.

When the motor has moved its bar 87 to contact and open the open limit switch 84 a current then flows from the wire 106 to the heater of time delay relay DR3. The contacts of time delay relay DR3, when closed, energizes the coil of quadrant relay QR4, over wires 83a and 83, which moves the armatures of the quadrant relay QR to the right as viewed in FIG. 3 which is the second quadrant position.

Opening the open limit switch 84 de-energizes the motor relay R6 which stops the motor M1. Moving the armatures of quadrant relay QR to quadrant two position interrupts the current to "open" signal wire 106 from the current source armature 76. The louvers 10 are now in a counter clockwise closed position and a low level of radiation intensity is now received by the photocells 25, 26 and 27, so that the current from the cells to relay R2, leaves relay R2 de-energized. Current from the source point 64 of relay R2 flows through point 68, through switch S1, over wires 105 and 81, through the center limit switch 80 and the wire 81a which energizes the heater of time delay relay DR2. After a selected delay the contacts of time delay relay DR2 close. Current through the contacts of time delay relay DR2 flows over wire 81b through the armature 82 of the quadrant relay QR, through the close limit switch 78, over wire 91 to energize relay R7 and start the motor M1 and rotate the louvers 10 in a clockwise direction as first disclosed hereinabove for louver closing movement but which now is a louver opening and light-admitting direction. This clockwise direction of the louver movement continues until solar radiation intensity increases the current enough to energize relay R2 and interrupt the motor energizing signal. This action continues intermittently in response to waning radiation intensity until the bar 87 contacts the center limit switch 80 which, when opened, breaks contact with the wire 81a and de-energizes the delay relay DR2. The louvers are now positioned normal to the building in fully opened position. The louvers remain in this position the remainder of the day.

Current from the source through contacts 64 and 68 of relay R2 builds up a charge in the condenser C2 through the diode D3 during the hours of darkness. The following morning, when radiation intensity reaches a predetermined value, current from the potentiometer P1 again energizes relay R2 to make contact with point 66 connected by wire 66a to the other winding of relay R9. The condenser C2 then discharges through the coil of rleay R9 closing its armature 101 with point 101a and energizing the quadrant relay QR5 over wire 103, through switch S1, armature 102 and wire 104 to move the quadrant relay QR to quadrant one position. This completes a normal 24 hour cycle of operation.

Figure 4:
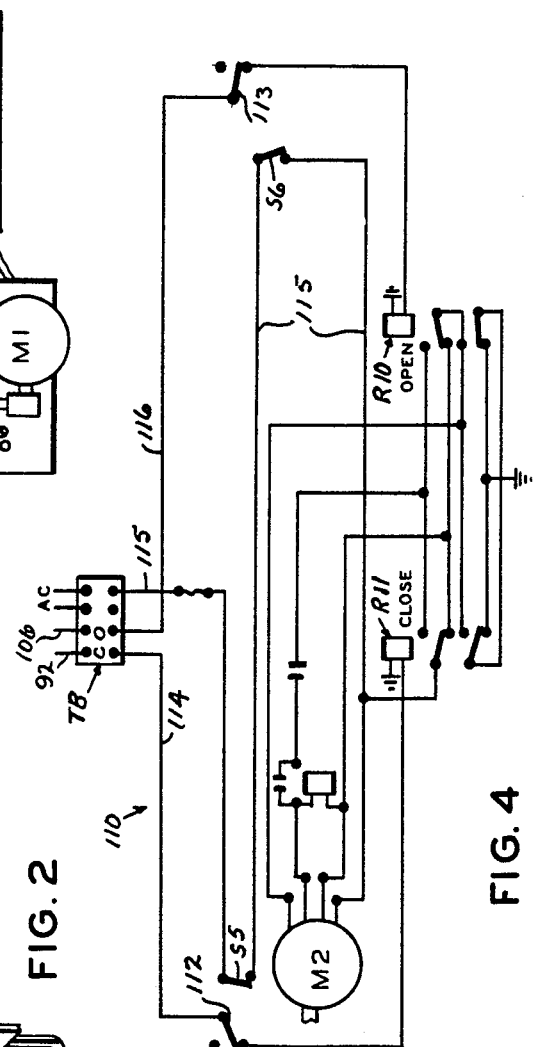
FIGURE 4 is a wiring diagram for additional power units for controlling other sets of louvers on the same elevation.

Louver closing signal wire 92 and louver opening signal wire 106 are each connected to a terminal block TB which may be in turn connected to one or more slave power units 110 (FIG. 4) which are connected with other sets of louvers, not shown, on the same elevation of the building. The slave power unit 110 is similarly provided with a motor M2, and wiring connected with motor starting relays R10 and R11, and close and open limits switches 112 and 113, respectively. Current from the source is supplied to the motor M2 by a wire 115 through positive "cut-off" switches S5 and S6. An "open" signal on the wire 106 from the control unit 12 is transmitted to the slave power unit wire 116 which energizes its motor starting relay R10 and starts the motor M2 in a louver opening direction in the manner disclosed hereinabove for the master power unit motor M1. Similarly a closing signal from the wire 92 is connected through the terminal block TB to the slave power unit closing wire 114 which energizes relay R11 and starts the motor M2 in a louver closing direction.

Positioning the louvers to operate in quadrant two as disclosed hereinabove by the action of the reversing relay R3 and its components similarly positions the sets of louvers, operated by the slave power units, in the second quadrant. An important function of the quadrant change action is synchronizing the motor or motors of the slave power units. This is accomplished when the master power unit motor M1 moves its bar 87 into contact with and opens the limit switch 84. Opening the limit switch 84 de-energizes the motor M1 but the signal continues to operate the slave power motor M2, during the time required for the delay relay DR3 to close its contacts and energize quadrant relay QR5, which allows the slave power motor to move its similar traveling nut or bar and open its limit switch 113 and stop its motor. Thus the motors M1 and M2 are synchronized before receiving a subsequent energizing signal as a result of energizing relay QR4 as disclosed hereinabove.

The master power unit 12 may be controlled manually by moving the switch S1 to manual operation. An open and close switch S2 has its armature connected with a contact of switch S1 in contact with the current source wire 70. Moving the armature of switch S2 to its "close" contact, energizes contact 73 in the switch S1 to pass a current to point 72 of relay R3 and to point 74 in relay QR which in turn passes a current over wire 91 through the close limit switch 78 and wire 92 to relay R7 and actuates the motor in a louver closing direction as disclosed hereinabove under solar operation. When the switch S2 is moved to louver "open" signal position, current flows from the wire 70 through switch S2 and the contact connected with the wire 105A of switch S1 over wire 81 through the center limit switch 80 energizing the heater of time delay relay DR2 which, when its contacts close, conducts a current through armature 82 of the relay QR to wire 106 which energizes the motor starting relay R6 and operates the motor in a louver opening direction as disclosed hereinabove. Manual operation of the system removes it from control of the solar operated electronic panel 18 but the respective limit switches as well as the respective positive "cut-off" switches still function in the manner disclosed hereinabove.

Obviously the invention is susceptible to some change or alteration without defeating its practicability, and I therefore do not wish to be confined to the preferred embodiment shown in the drawings, and described herein, further than I am limited by the scope of the appended claims.

I claim:
1. An apparatus for controlling the light level behind a set of parallel, elongated, vertically extending louvers each mounted on a building for pivotal movement about a vertical axis extending parallel to the face of the building, said apparatus comprising:
   motor means drivingly connected with said louvers for pivoting the louvers in response to the rotation of said motor;
   at least one photocell mounted on one of said louvers;
   current amplifying means connected with said photocell and said motor means, said current amplifying means including
      a rectifier,
      an amplifier connected between said rectifier and said photocell, and
      a pair of relays connected with said amplifier;
   a pair of motor starting relays connected with said motor and controlling the directional rotation of said motor;
   a reversing relay connected with said pair of motor starting relays and with said pair of relays connected with said amplifier;
   a quadrant relay connected with said amplifier and with said pair of motor starting relays; and,
   a pair of time delay relays connected with said quadrant relay and with said motor starting relays, whereby a predetermined period of time must elapse before a change in the radiation intensity received by said photocell will actuate said motor starting relays to start said motor in opposing directions in response to the respective high or low level of radiation intensity received by said photocell.
2. An apparatus for controlling the light level behind a set of parallel, elongated, vertically extending louvers each mounted on a building for pivotal movement in at least two quadrants about a vertical axis extending parallel to the face of the building, said apparatus comprising:
   a power unit including
      a control motor having a drive shaft;
      means drivingly interconnecting said drive shaft with one set of said louvers for pivoting the louvers in said one set about the respective vertical axes in response to the rotation of said motor;
   an electronic control unit for driving said control motor in response to the level of light radiation on the face of said building, said electronic control unit including
      light sensitive current controlling means mounted on one of the louvers in said set of louvers; said light sensitive current controlling means including
         a photocell positioned on the outer vertical edge of one of the louvers in said set of louvers, and
         a pair of photocells each mounted on an opposite face of said one louver in a position to be shaded by the louvers adjacent said one louver at selected times during the pivotal movement of said louvers about their respective vertical axes;
      a source of electrical energy;
      current amplifying means connected with said source of electrical energy and interposed between said light sensitive current amplifying means and said power unit; said current amplifying means including
         a first amplifier connected with said light sensitive current controlling means;

a pair of amplifiers connected in parallel with said first amplifier;

first and second relays connected with said pair of amplifiers, respectively, and with said motor, said second relay passing a current to said control motor for starting said control motor and rotating the louvers in said set of louvers toward a light admitting position in response to low level in radiation intensity at said light sensitive current controlling means, and being responsive to the high level of radiation intensity for interrupting a circuit to said motor when radiation intensity on said light sensitive current controlling means reaches a predetermined value, said first relay being energized by a high level of radiation intensity on said light sensitive current controlling means and passing a signal to said motor for starting said motor rotating said louvers in said set of louvers toward a closed position.

3. An apparatus for controlling the light level behind sets of parallel, elongated, vertically extending louvers as defined in claim 2 and further characterized to include a threaded shaft drivingly connected to the drive shaft of said control motor;

a bar threadedly engaged with said threaded shaft for movement bidirectionally along the shaft in response to the respective direction of rotation of the motor connected to said threaded shaft;

a pair of spaced limit switches mounted adjacent the threaded shaft and contacted by the bar of said shaft when the set of louvers actuated by said control motor is in a closed position, said limit switches cooperating with said bar to stop the rotation of said motor driving said threaded shaft; and a quadrant relay connected with said source of electrical energy, said control motor, and with said limit switches, whereby engagement of said bar with one of said limit switches breaks the circuit to said control motor and actuates said quadrant relay whereupon said control motor is again energized and caused to rotate in the opposite direction moving said louvers from a quadrant one to a quadrant two position.

4. An apparatus for controlling the light level behind sets of parallel, elongated, vertically extending louvers each mounted on a building for pivotal movement about a vertical axis extending parallel to the face of the building, said apparatus comprising:

(1) a master power unit including
 (a) a first control motor having a drive shaft;
 (b) means drivingly interconnecting said drive shaft with one set of said louvers for pivoting the louvers in said one set about their respective vertical axes in response to the rotation of said motor;

(2) an electronic control unit for driving said first control motor in response to the level of light radiation on the face of said building, said electronic control unit including
 (a) light sensitive current controlling means mounted on one of the louvers in said one set of louvers;
 (b) a source of electrical energy;
 (c) current amplifying means connected with said source of electrical energy and interposed between said light sensitive current controlling means and said master power unit; said current amplifying means including
  (i) a first amplifier connected with said light sensitive current controlling means;
  (ii) a pair of amplifiers connected in parallel with said first amplifier;
  (iii) first and second relays connected with said pair of amplifiers, respectively, and with said first control motor, said second relay passing a current to said first control motor for starting said first control motor and rotating the louvers in said one set of louvers toward a light admitting position in response to a low level in radiation intensity at said light sensitive current controlling means, and being responsive to a high level of radiation intensity for interrupting a circuit to said motor when radiation intensity on said light sensitive current controlling means reaches a predetermined value, said first relay being energized by a high level of radiation intensity on said light sensitive current controlling means and passing a signal to said motor for starting said motor and rotating said louvers in said one set of louvers toward a closed position;

(3) at least one slave power unit connected with said current amplifying means, and responsive to electrical signals developed by said current amplifying means when one of said first and second relays are actuated, said slave power unit including an additional control motor driving another set of said louvers in opening and closing pivotal movement in response to said electrical signals; and (4) means for synchronizing the rotation of said first control motor with the energization of the control motors in the respective slave power unit whereby said sets of louvers controlled by said control motors simultaneously drive their respective sets of louvers to a closed position and are synchronized while pivoting in two quadrants of 90°.

5. An apparatus for controlling the light level behind sets of parallel, elongated, vertically extending louvers as defined in claim 4 wherein said light sensitive current controlling means comprises:

(a) a photocell positioned on the outer vertical edge of one of the louvers in said one set of louvers; and (b) a pair of photocells each mounted on an opposite face of said one louver in a position to be shaded by the louvers adjacent said one louver at selected times during the pivotal movement of said louvers about their respective vertical axes.

6. An apparatus for controlling the light level behind said sets of parallel, elongated, vertically extending louvers as defined in claim 4 wherein said means for synchronizing the energization of said control motors comprises:

a threaded shaft drivingly connected to the drive shaft of each of said control motors;

bars threadingly engaged with each of said threaded shafts for movement to and fro along the respective shafts in response to the respective direction of rotation of the respective motors connected to said threaded shafts;

limit switches mounted adjacent each of the respective threaded shafts and contacted by the bar of the respective shaft when the sets of louvers actuated by the respective control motors are in a closed position, said limit switches cooperating with their respective bars to stop the rotation of the respective control motor driving the respective threaded shaft; and time delay relay means for retaining said first control motor in a de-energized condition until each of the other control motors drives its respective threaded shaft in rotation to an extent sufficient to move the respective bars threaded on the respective threaded shafts of said other control motors into contact with their respective limit switches whereby said sets of louvers are each concurrently placed in a closed position.

7. An apparatus for controlling the light level behind sets of parallel, elongated, vertically extending louvers as defined in claim 6 wherein said light sensitive current controlling means comprises:
   (a) a photocell positioned on the outer vertical edge of one of the louvers in said one set of louvers; and
   (b) a pair of photocells each mounted on an opposite face of said one louver in a position to be shaded by the louvers adjacent said one louver at selected times during the pivotal movement of said louvers about their respective vertical axes.

8. An apparatus for controlling the light level behind sets of parallel, elongated, vertically extending louvers as defined in claim 7 and further characterized to include connected to said time delay relay means and between said current amplifying means and said first control motor:
   (a) a reversing relay;
   (b) a quadrant relay connected to said reversing relay;
   (c) a pair of motor starting relays connected to said motor for controlling the direction of rotation of said motor; and
   (d) electrical circuit means interconnecting said reversing, quadrant and motor starting relays with said current amplifying means and said first control motor for rotating said first control motor alternately in opposing directions in response to the respective high and low levels of radiation intensity received collectively by said photocells.

References Cited by the Examiner
UNITED STATES PATENTS

| | | | |
|---|---|---|---|
| 2,917,795 | 12/59 | Brown | 20—62 |
| 2,962,647 | 11/60 | Borenstein | 160—5 X |
| 2,981,845 | 4/61 | Larew et al. | 250—219 |
| 3,064,131 | 11/62 | Brown | 250—203 |

RALPH G. NILSON, *Primary Examiner.*

WALTER STOLWEIN, *Examiner.*